United States Patent

Farver

[15] 3,638,274
[45] Feb. 1, 1972

[54] WINDOW WIPER AND SCRAPER BLADE

[72] Inventor: Alfred Farver, 1106 Haven St., Mount Morris, Mich. 48458

[22] Filed: June 12, 1970

[21] Appl. No.: 45,802

[52] U.S. Cl. .................... 15/250.41, 15/250.1, 15/250.42
[51] Int. Cl. ................................. B60s 1/02, A471 1/00
[58] Field of Search ......... 15/250.38, 250.4, 250.41, 250.42, 15/250.36, 250.1

[56] References Cited

UNITED STATES PATENTS

| | | | |
|---|---|---|---|
| 3,116,510 | 1/1964 | Oishei et al. | 15/250.42 |
| 2,775,780 | 1/1957 | Pisano | 15/250.41 X |
| 3,104,411 | 9/1963 | Presser | 15/250.1 X |
| 3,545,027 | 12/1970 | Sargeant et al. | 15/250.1 X |
| 983,269 | 2/1911 | Davis et al. | 15/250.1 |
| 3,328,825 | 7/1967 | Anderson | 15/250.36 |
| 1,786,457 | 12/1930 | Sarver | 15/250.41 X |
| 3,431,577 | 3/1969 | Minsky | 15/250.04 |
| 1,953,703 | 4/1934 | Dirienzo | 15/250.42 X |

*Primary Examiner*—Peter Feldman
*Attorney*—Hauke, Gifford and Patalidis

[57] ABSTRACT

A combination wiper and scraper blade for cleaning curved and/or straight window surfaces comprising a pair of elongated resilient members, such as rubber blades, having parallel wiping edges extending lengthwise thereof with a plastic member disposed therebetween and having a wiping edge parallel to the wiping edges of the resilient members. The plastic member is so constructed that it is uniformly reversibly flexible throughout its lengthwise wiping edge in a plane generally perpendicular to the window surface to be wiped such that the wiping edge will conform to the contour of the window surface while being relatively inflexible in a plane which is generally at right angles thereto. In a second embodiment, means are provided for retracting and extending the plastic member to selectively engage and disengage the window surface.

17 Claims, 11 Drawing Figures

PATENTED FEB 1 1972                                3,638,274
SHEET 1 OF 2
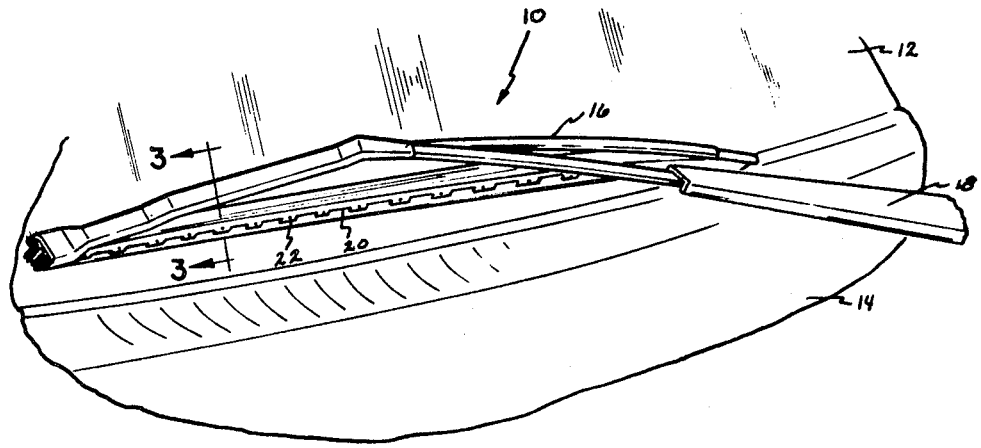
FIG-1
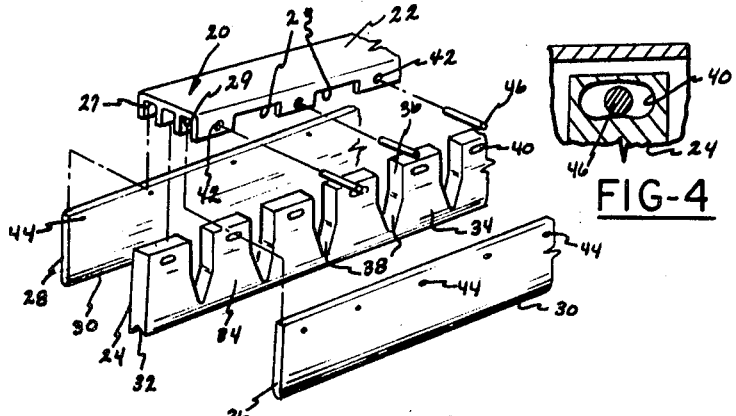
FIG-2
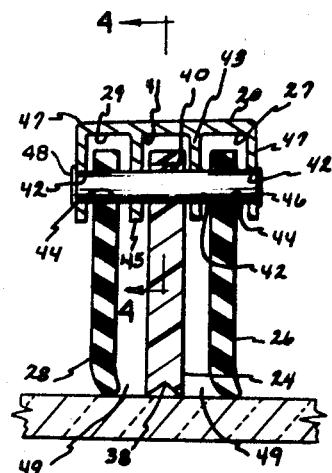
FIG-4
FIG-3
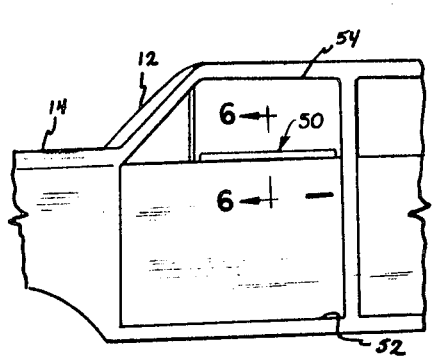
FIG-5
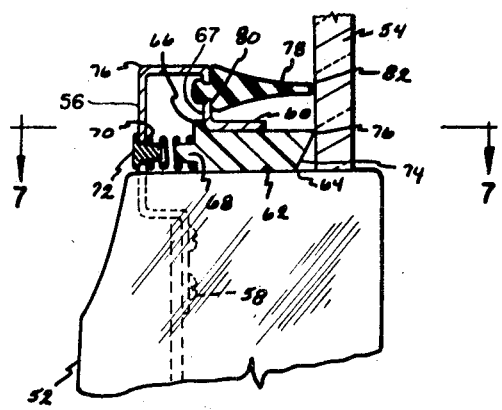
FIG-6
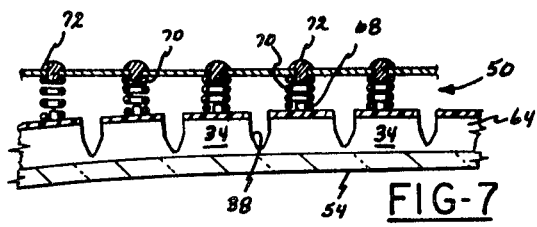
FIG-7
INVENTOR
ALFRED FARVER
BY
Hauke Gifford & Patalidis
Attorneys

INVENTOR
ALFRED FARVER

WINDOW WIPER AND SCRAPER BLADE

BACKGROUND OF THE INVENTION

1. Field of the Invention

The present invention pertains to the art of window cleaning, and particularly to a flexible wiping element especially adapted for cleaning curved windows used in automobiles and the like.

2. Background of the Invention

Heretofore, window wiper assemblies for automotive use have normally been comprised of two separate and distinct members, usually a rubber wiper blade mounted beneath a backing strip of metal, which in turn is substantially uniform and flexible in a plane perpendicular to the surface to be wiped and substantially inflexible in a plane at right angles thereto. The rubber wiper blade is normally carried by the backing strip so as to be freely tiltable relative thereto, while, the backing strip is operatively connected to a pressure distributing means which in turn is driven in a back and forth motion across the windshield of the automobile or the like. Although the previously used blade assemblies have functioned in an acceptable manner in cleaning extremely curved window surfaces, more commonly known as wraparound windshields, they are almost totally ineffective in removing ice, frost and bugs from the surface of such windshields.

It would therefore be desirable to provide a windshield wiper blade, which, in addition to functioning in an acceptable manner in cleaning extremely curved windows would also completely eliminate the problem of removing frost and ice therefrom.

SUMMARY OF THE INVENTION

The present invention, which will be described subsequently in greater detail, comprises a wiper blade construction having a hard plastic member and a resilient member disposed in a side-by-side relationship forming a pair of parallel wiping edges for cleaning curved and/or straight window surfaces. The hard plastic member is so designed that it is flexible about its lengthwise wiping edge in a plane generally perpendicular to the windshield surface that is desired to be wiped, such that the wiping edge thereof is adapted to conform to the contour of the windshield surface; while at the same time the hard plastic member is relatively inflexible along its wiping edge in a plane which is generally parallel to the surface being wiped.

In a second embodiment, the hard plastic member is mounted in a casing between two resilient members and is provided with means to independently retract and extend the hard plastic member to selectively engage and disengage the window surface.

It is therefore an object of the present invention to provide such a window blade which is adapted to remove ice, frost and bugs from the window surface to be wiped.

Other objects, advantages and applications of the present invention will become apparent to those skilled in the art of wiper blades when the accompanying description of some examples of the best modes contemplated for practicing the invention is read in conjunction with the accompanying drawings.

BRIEF DESCRIPTION OF THE DRAWINGS

The description herein makes reference to the accompanying drawings wherein like reference numerals refer to like parts, and in which:

FIG. 1 is a fragmentary perspective view of one embodiment of an automotive windshield wiper blade assembly embodying the principles of the present invention;

FIG. 2 is a fragmentary exploded view in perspective of the windshield wiper blade illustrated in FIG. 1;

FIG. 3 is a cross-sectional view of the windshield wiper blade illustrated in FIG. 1 and taken on line 3—3 thereof;

FIG. 4 is a fragmentary cross-sectional view taken on line 4—4 of FIG. 3;

FIG. 5 is a plane side view of an automobile illustrating a second embodiment of a wiper blade embodying the principles of the present invention;

FIG. 6 is a fragmentary cross-sectional view of the window wiper blade illustrated in FIG. 5 and taken on line 6—6 thereof;

FIG. 7 is a fragmentary cross-sectional view of the wiper blade illustrated in FIG. 6 and taken along line 7—7 thereof;

DESCRIPTION OF THE PREFERRED EMBODIMENTS

Figure 8:
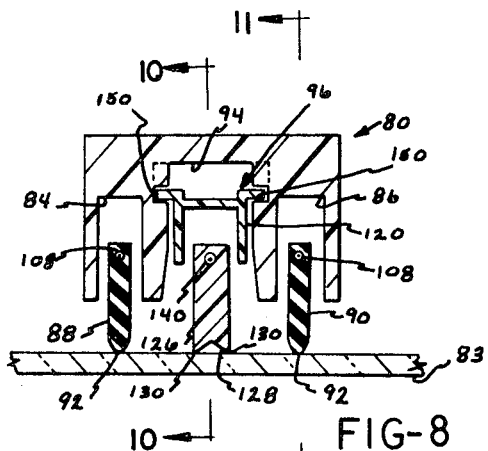
FIG. 8 is a cross-sectional view of a third embodiment of a wiper blade embodying the principles of the present invention and taken along line 8—8 of FIG. 10.
Figure 9:
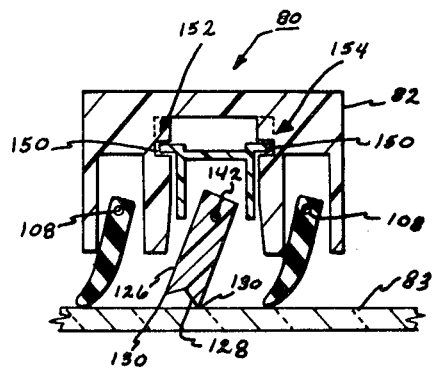
FIG. 9 is a cross-sectional view similar to FIG. 8 showing the position of the wiper blade during a wiping stroke.

Referring now to the drawings and more particularly to FIG. 1, wherein there is illustrated an example of the present invention in the form of an automobile windshield wiper assembly 10 adapted to clean the surface of a windshield 12 of an automobile 14. The windshield wiper assembly 10 comprises a conventional pressure distributing means in the form of a yoke 16 having one end detachably connected to an arm 18. The opposite end of the yoke 16 is fastened to a multichannelled support member 22, which in turn supports a plurality of wiper blades generally indicated by the numeral 20 and which will be described in detail hereinafter. The multichannelled support member 22 is provided with a plurality of longitudinally spaced cutout portions 23 extending completely therethrough to permit the support member 22 to bend about its longitudinal length. The wiper assembly 10 functions in a conventional manner having motor means (not shown) which drives the arm 18 and yoke 16, and thus the wiper blades 20 back and forth across the surface of the windshield 12. Since the windshield of modern automobiles generally have an extremely curved surface, the wiper blades 20 must be flexible enough so that the entire wiping edges thereof remains in contact with the surface of the windshield throughout the wiping motion to ensure the complete removal of the elements and the like thereon, such as rain, bugs, snow, ice and/or frost.

As can best be seen in FIGS. 2 and 3, the windshield contacting portions of the wiper blades 20 comprise a relatively hard center element 24 and a pair of outer elongated resilient elements 26 and 28. The resilient elements 26 and 28 are disposed on opposite sides of the center element 24 and are respectively carried in the outer channels 27 and 29 of the support member 22. The outer resilient elements 26 and 28 are preferably composed of rubber or a rubberlike material and have a freely tiltable wiping edge 30 extending lengthwise thereof. The outer resilient elements 26 and 28 are similar to the conventional rubber wiper blades in the manner in which they are constructed and function and no further detailed description of them is necessary.

Still referring to FIGS. 2 and 3, the center element 24 is composed of a relatively hard flat piece of plastic or the like, the lower edge of which has a V-shaped groove 29 forming a double-wiping edge 32 extending lengthwise thereof. The center element 24 includes a plurality of longitudinally spaced teeth 34 which extend up from the wiping edge in a plane parallel to the resilient elements 26 and 28. Each tooth 34 has parallel sidewalls 36 extending approximately midway down the tooth 34 and then are inclined toward one another to form a V-shaped notch 38 which terminates at a point upwardly spaced from the wiping edge 32. The center element 24 is disposed in a central channel 41 intermediate the outer channels 27 and 29, with the channels 27 and 41 and 29 and 41 having common channel walls 43 and 45, respectively.

As can best be seen in FIG. 4, the top portion of each tooth 34 has a transversely extending bore 40, each of which is axially aligned with one of a plurality of spaced bores 42 and 44, respectively, extending through each channel wall of the support member 22 and each of the resilient elements 26 and 28. A plurality of holding pins 46 extend through the axially aligned channel bores 42, the resilient element bores 44 and the tooth bores 40 to retain securely each element within its respective channel as illustrated in FIGS. 2 and 3. The holding pins 46 are fixed to the outer channel walls 47 of support member 22 to prevent relative sliding movement of the elements. The holding pins 46 are attached to the outer channel walls 47 by any suitable means, such as by flattening the opposite ends of each holding pin 46, as illustrated at 48 in FIG. 3. The tooth bores 40 are kidney shaped and have a width slightly greater than the diameter of the holding pin 46 to permit a slight up and down motion while also permitting relative movement along the longitudinal curved length of the bore 40. This relative movement between the holding pins 46 and each tooth bore 40 permits the adjacent teeth 34 to move toward and away from one another as the wiping edge 32 of the center element 24 and the wiping edges 30 of each of the resilient elements 26 and 28 bend in order to follow the contour of the windshield 12. As the wiper blade 20 moves back and forth across the windshield 12, the arm 18 exerts a force against the wiper blade of sufficient magnitude to ensure contact between the wiping edges 30 and 32 and the surface of the windshield 12.

The V-shaped notches 38, being longitudinally spaced across the length of the plastic center element 24 permit each adjacent tooth 34 to flex relative to one another along the lengthwise wiping edge 32 in a plane which is generally perpendicular to the surface of the windshield 12. Thus the wiping edge 32 of the hard plastic center element 24 will conform to the window contour, while at the same time the thickness of the center element 24 prevents flexing in a direction which is generally at right angles to the center element, that is, in a direction which is generally parallel to the surface of the windshield 12. The degree of flexibility of the center element 24 is a function of the cross-sectional area of that portion of the element 24 between the V-shaped notch 38 and the wiping edge 32. As this area is increased in size, the amount of flexibility decreases and vice versa. The spacing 49 between the center element 24 and the adjacent resilient elements 26 and 28 permits frost, ice, snow and the like to escape and thus prevent any buildup which would lift the wiper blade 20, away from the windshield 12.

Referring now to FIGS. 5, 6 and 7 for an illustration of a second embodiment of the present invention in the form of a wiper blade 50 adapted to be mounted on the side door 52 of the automobile 14 adjacent a side window 54, and which cooperates therewith to remove frost, snow, ice and/or rain therefrom as the side window 54 is retracted into the interior of the door 52 in the conventional manner.

The wiper blade 50 comprises a channel-shaped frame 56 mounted on the top portion of a door 52 by screws 58. Frame 56 has a horizontally extending flange 60 forming a slot 62 extending the length of the frame 50 through which a plastic window scraper 64 is slidably disposed. The scraper 64 is similar to the center portion 24 hereinbefore described except the inner end of the scraper 64 has an upwardly extending lip 66 which is adapted to abut the inner side 67 of the frame 56 to limit the amount of movement of the scraper 64 toward the side window 54. A stem 68 extending from the inner side of each tooth 34 of the scraper 64 receives a coil-type spring 70 which biases the scraper in the direction of the window 54. The opposite end of the spring 70 is received by a stem 72, which in turn is carried by the frame 56, as illustrated in FIGS. 6 and 7.

The window engaging end of the scraper 64 has an inclined surface 74, the outer end of which forms a wiping edge 76 which engages the surface of the window 54 in order to remove snow, ice and the like therefrom as the window 54 is retracted into the interior of the door 52. When the window 54 is in an extended position, as illustrated in FIG. 6, there is a slight clearance between the lip 66 and the inner side 67 of the frame 56 so as to ensure that the full biasing force of the spring 70 is exerted against the window 54. After the window 54 has been fully retracted, the lip 66 abuts against the inner side 67 of frame 56 to prevent the scraper from being withdrawn from the slot 62.

A resilient or rubberlike wiper blade 78 is removably carried by the frame 56 in a slot 80 at a position immediately above the scraper 64 and has an outer tip 82 which engages the surface of the window 54 and functions to aid the scraper 64 in removing rain, snow, ice and the like from the surface of the window 54.

As can be seen in FIG. 7, the V-shaped notches 38 between each tooth 34 of the scraper 64 permit the same to flex in a plane which is perpendicular to the surface of the window 54 in the same manner as the plastic center element 24 flexes with respect to the surface of the windshield 12. At the same time, the relative thickness of the scraper 64 prevents flexing in a direction which is generally parallel to the surface of the window 54. The springs 70, in addition to biasing each tooth 34 of the scraper 64 against the window 54 to ensure that the snow and ice is removed therefrom, still permit flexing movement of the scraper 64 to permit it to conform to the contour of the surface of the window 54 in the same manner as hereinbefore mentioned in the description of the plastic center element 24.

Referring now to FIGS. 8–11 wherein there is illustrated a third embodiment of the present invention in the form of a windshield wiper blade 80 connected to an arm 81 and adapted to be driven back and forth across a windshield 83 of an automobile in a manner similar to the windshield wiper assembly 10 hereinbefore described.

The wiper blade 80 comprises an outer multichanneled nonflexible support member 82 having outer channels 84 and 86 for respectively supporting resilient elements 88 and 90. The resilient elements 88 and 90 are similar to the resilient elements 26 and 28 hereinbefore described and are preferably composed of a rubber or rubberlike material; each element having a freely tiltable wiping edge 92 extending lengthwise thereof. The support member 80 is provided with a center channel 94 in which there is mounted a plastic scraper assembly, generally indicated by the numeral 96, and which will be described in greater detail hereinafter.

The support member 82 has vertical end walls 98 and 100 and cover sections 102 and 104 respectively associated therewith which serves to conceal certain components of the wiper blade 80 as will be described hereinafter. An upwardly extending flange 106 disposed on the upper surface of the support member 82 provides a means for attaching the support member 82 to the arm 81.

Figure 11:
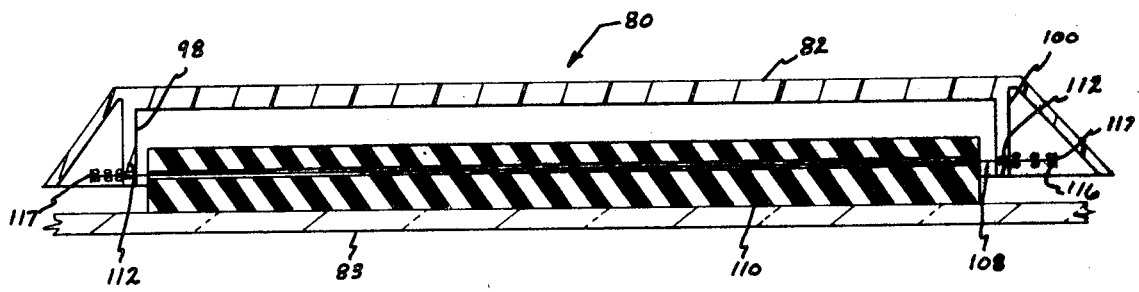

As can best be seen in FIG. 11, the resilient members 88 and 90 are carried within their respective channels by cables 108 which extend through a longitudinal bore 110 in each of the resilient elements and bores 112 formed in each end wall 98 and 100. Springs 114 and 116 carried around the cables at their opposite ends between the outer portion of walls 98 and 100 and enlarged end portions 117 of the cable 108 support the resilient elements in an upright position within their respective channels. The springs 114 and 116 in the cable 108 are of such a resiliency as to permit the elements 88 and 90 to flex about their longitudinal axis so as to follow the contour of the windshield while at the same time the springs 114 and 116 are of sufficient strength to maintain the resilient elements 88 and 90 in contact with the windshield 83. The amount of tilting of each of the resilient members 88 and 90 is limited by abutment with the opposite walls of the respective channels 84 and 86.

Each covers 102 and 104 conceal the springs and the enlarged end portions 117 of the cables 108 thus adding to the overall appearance of the wiper 80.

Figure 10:
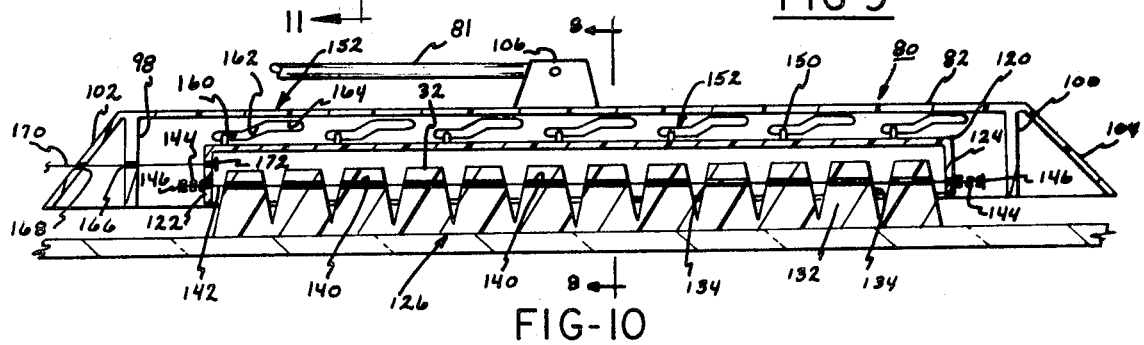
FIG. 10 is a cross-sectional view of the wiper blade illustrated in FIG. 8 and taken on line 10—10 thereof; and, FIG. 11 is a cross-sectional view of the wiper blade illustrated in FIG. 8 and taken on line 11—11 thereof.

Referring to FIGS. 8 and 10, the scraper assembly 96 comprises a channel member 120 having end walls 122 and 124. A center element 126 similar to the center element 24 of FIG. 2 comprises a relatively hard flat piece of plastic, or the like, the lower edge of which has a V-shaped groove 128 forming a double-wiping edge 130 extending lengthwise thereof. The center element 126 includes a plurality of longitudinally spaced teeth 132 which extend upwardly from the wiping edges 130 in a plane parallel to the resilient elements 88 and 90. Each of the teeth 132 has a inclined sidewall 134 which forms a V-shaped notch intermediate each tooth and which terminates at a point upwardly spaced from the wiping edges 130. Each of the teeth 132 has a bore 140 extending longitudinally therethrough and in axial alignment with adjacent teeth bores 140 through which a cable 142 extends. Cable 142 is mounted by means of springs 144 and 146 respectively disposed between the opposite end walls 122 and 124 and enlarged end portions 148 formed at the opposite ends of the cable 142 in a manner similar to the mounting of the resilient elements 88 and 90.

The cable 142 permits the upper portion of each adjacent tooth to move toward and away from one another as the wiping edge 130 bends in order to follow the contour of the windshield 83 so as to maintain contact therewith during the entire wiping stroke. The cable 142 and the springs 144 and 146 must be of such a resiliency to permit the teeth 132 to flex while at the same time of sufficient strength to maintain the center element 126 in constant contact with the windshield 83.

The channel member 120 has a plurality of longitudinally spaced pairs of axially extending pin members 150 integrally formed therewith. The outer ends of the pin members 150 are received in a plurality of slots 152 and 154 (FIG. 9) respectively formed in opposing walls 156 and 158 in the center channel 94.

As can best be seen in FIG. 10 each slot 156 and 158 has a lower horizontal portion 160, an intermediate inclined portion 162, and an upper horizontal portion 164. End wall 98 and cover section 102, respectively, have bore 166 and 168 through which a cable 170 extends. One end of cable 170 is fixedly attached to the scraper assembly end wall 122 by any suitable means such as fastener 172. The other end of cable 170 is operatively coupled to a suitable mechanism (not shown) attached to the dashboard of the automobile to permit the operator thereof to move the scraper assembly 96 back and forth generally along the longitudinal axis of the channel support 82. As the scraper assembly 96 is moved in a rightwardly direction as viewed in FIG. 10, the pins 150 will follow the contour of the slots 152 and 154, that is the pins 150 will be guided horizontally by the slot portions 160, upwardly by the slot portions 162 and again horizontally by the slot portions 164 thereby raising the entire scraper assembly 96 upwardly and thus raising the wiping edges 130 away from the windshield 83. Thus a simple means is provided for withdrawing the scraper assembly 96 from the windshield 83 when use thereof is not required such as during the summer months.

When use of the scraper assembly 96 is desired, the cable 170 is actuated so as to cause the scraper assembly 96 to be shifted leftwardly as viewed in FIG. 10 until the pins 150 are repositioned within the horizontal slot portions 160 and the wiping edges 130 again engage the windshield 83.

It can thus be seen that the present invention provides a new and improved wiper blade for cleaning curved and/or straight window surfaces, which is simple and inexpensive in its construction and which is adapted for use on present day automotive vehicles. The rubber elements of the wiper blade perform the function of ordinary wiper blades and, in addition, aid in the removal of the snow, bugs, ice or the like loosened by the center section 24. In a second embodiment, means are provided for retracting the center plastic element such that the wiper blades of the present invention can, if desired, be left on the automobile year around. Thus unlike previous constructions, it is not necessary to replace the ordinary wiper blades with new blades for winter driving.

While the forms of the several embodiments of the present invention as disclosed herein constitute preferred forms, it is to be understood that other forms may be adapted, all coming within the scope of the claims which follow.

What is claimed is as follows:

1. A wiper blade for cleaning curved or straight window surfaces comprising:
   an elongated resilient member having a wiping edge extending lengthwise, thereof;
   a relatively hard elongated member adjacent said resilient member and having a wiping edge extending lengthwise thereof, said relatively hard member being substantially uniformly reversely flexible throughout its lengthwise wiping edge in a plane generally perpendicular to said window surface to be wiped so as to conform to the contour of said window surface, and relatively inflexible in a plane generally parallel to said window surface thereof, said relatively hard member comprises a plurality of flat plastic elements arranged in an end-to-end fashion;
   a holder having a plurality of longitudinally extending channels, said hard member and said resilient member being disposed in separate channels of said holder in a side-by-side fashion; and
   means for maintaining said members in said separate channels.

2. The wiper blade defined in claim 1, including a second elongated resilient member having a wiping edge extending longitudinally thereof, said second member being disposed in a channel adjacent said hard member on the side thereof opposite said first mentioned resilient member.

3. A wiper blade for cleaning curved or straight window surfaces comprising:
   an elongated resilient member having a wiping edge extending lengthwise thereof;
   a relatively hard elongated member adjacent said resilient member and having a wiping edge extending lengthwise thereof, said relatively hard member being substantially uniformly reversely flexible throughout its lengthwise wiping edge in a plane generally perpendicular to said window surface to be wiped so as to conform to the contour of said window surface, and relatively inflexible in a plane generally parallel to said window surface thereof;
   means for maintaining said members adjacent one another;
   said relatively hard member comprising a flat strip of plastic material, the outer edge of which forms said wiping edge, said plastic strip having a plurality of longitudinally spaced teeth extending from the edge of said strip opposite said wiping edge; and
   means permitting the outer ends of said teeth to tilt towards one another as said wiping edge of said plastic strip flexes to conform to the contour of said window surface.

4. The wiper blade defined in claim 3 including a second elongated resilient member having a wiping edge extending longitudinally thereof, said second resilient member being adjacent said hard member on side thereof opposite said first member.

5. A wiper blade for cleaning curved or straight window surfaces comprising:
   an elongated resilient member having a wiping edge extending lengthwise thereof;
   a relatively hard elongated member adjacent said resilient member and having a wiping edge extending lengthwise thereof, said relatively hard member being substantially uniformly reversely flexible throughout its lengthwise wiping edge in a plane generally perpendicular to said window surface to be wiped so as to conform to the contour of said window surface, and relatively inflexible in a plane generally parallel to said window surface thereof;
   means for maintaining said members adjacent one another;
   means mounting said wiper blade for movement back and forth across said window surface;
   means biasing said wiping edges of said wiper blade against said window surface with a force of a predetermined amount;

a second elongated resilient member having a wiping edge extending longitudinally thereof, said second resilient member being adjacent said hard member on the side thereof opposite said first-mentioned resilient member; and said relatively hard member comprising a strip of plastic material the outer edge of which forms said wiping edge, said strip having a plurality of longitudinally spaced teeth extending from said edge opposite said wiping edge, and means permitting the outer ends of said teeth to be tilted toward one another as said wiper blade moves back and forth thereacross.

6. A wiper blade for cleaning curved or straight window surfaces comprising:

an elongated resilient member having a wiping edge extending lengthwise thereof;

a relatively hard elongated member adjacent said resilient member and having a wiping edge extending lengthwise thereof, said relatively hard member being substantially uniformly reversely flexible throughout its lengthwise wiping edge in a plane generally perpendicular to said window surface to be wiped so as to conform to the contour of said window surface, and relatively inflexible in a plane generally parallel to said window surface thereof;

means for maintaining said members adjacent one another;

means mounting said blade proximate the lower portion of the window to be wiped;

means moving said window and said blade relative to one another to permit said blade to clean said window;

said relatively hard member comprising a continuous flat strip of said hard material, the outer edge of which forms said wiping edge, said strip having a plurality of longitudinally spaced teeth extending from the edge of said strip opposite said wiping edge, and means permitting the outer ends of said teeth to tilt toward one another as said wiping edge flexes to conform to the contour of said window surface as said wiping edge and said window move relatively to one another.

7. The wiper blade defined in claim 6, wherein said relatively hard member is made of plastic material.

8. The wiper blade defined in claim 6, wherein said wiping edge of said hard member is spring biased toward engagement with said window surface.

9. The wiper blade as defined in claim 1 including means for selectively raising and lowering said hard member within said holder for selectively causing engagement and disengagement of the wiping edge of said hard member with the surface of said window.

10. A device for cleaning curved or straight window surfaces comprising:

an elongated holder having at least two longitudinally extending channels;

an elongated resilient member having a wiping edge extending lengthwise thereof, said resilient member being mounted in one of said longitudinally extending channels;

a relatively hard elongated member mounted in the other of said channels and adjacent said resilient member and having a wiping edge extending lengthwise thereof, said relatively hard member being substantially uniformly reversibly flexible throughout its lengthwise wiping edge in a plane generally perpendicular to the window surface to be wiped so as to conform to the contour of said window surface, and relatively inflexible in a plane generally parallel to said window surface; and means for selectively raising and lowering said relatively hard elongated member within said holder to and away from said window surface to selectively cause engagement and disengagement of said wiping edge with said window surface.

11. The device as defined in claim 10 including a second channel shaped member carrying said relatively hard elongated member and disposed in said first-mentioned hard member carrying channel; said second channel member having a plurality of longitudinally spaced pairs of axially extending pins adapted to engage a plurality of upwardly extending slots formed in the walls of said first-mentioned channel whereby movement of said channel pins in said wall slots causes said hard member to be raised and lowered with respect to said window surface.

12. The device defined in claim 11 including a bore extending longitudinally through said elongated resilient member and a bore extending longitudinally through said elongated hard member; a cable disposed in each of said bores; each of said channels having opposite end walls; said end walls having means disposed on the outer portion thereof engaging said cables and biasing said cables outwardly.

13. The device defined in claim 12, wherein said biasing means comprising a coil spring disposed between an enlarged portion formed at the opposite ends of each cable and the outer wall of each of said end walls.

14. A wiper blade for cleaning curved or straight window surface comprising:

a resilient member having a wiping edge extending lengthwise thereof;

a relatively hard member adjacent said resilient member and comprising a flat strip of plastic material, the lower edge of which forms a wiping edge extending lengthwise thereof, said strip having a plurality of longitudinally spaced teeth opposite said wiping edge, said relatively hard member being substantially uniformly reversely flexible throughout its lengthwise wiping edge in a plane generally perpendicular to said window surface so as to conform to the contour of said window surface and relatively inflexible in a plane generally parallel to said window surface;

a holder having a plurality of longitudinally extending channels, said hard member being disposed in one of said holder channels, said resilient member being disposed in another of said holder channels;

a bore extending longitudinally through each of said teeth of said hard member, each of said bores being in axial alignment;

a cable extending through each of said aligned bores, the ends of said cable being carried by said holder; and means engaging the ends of said cable to maintain said cable in tension.

15. The wiper blade defined in claim 14 wherein said holder channels have opposite end walls, said end walls having means disposed on the outer portion thereof engaging said cable to bias same in tension, said biasing means comprising coil springs disposed between an enlarged portion formed on the outer ends of said cables and the outer walls of each of said channel end walls.

16. The wiper blade defined in claim 14 further comprising a second bore extending longitudinally through said resilient member; a second cable extending through said second bore, the ends of said second cable being carried by said holder; and means engaging the ends of said second cable to maintain said second cable in tension.

17. The wiper blade defined in claim 16 wherein said holder channels have opposite end walls, said end walls having means disposed on the outer portion thereof engaging each of said cables to bias same in tension, said biasing means comprising coil springs disposed between an enlarged portion formed on the outer ends of each of said cables and the outer walls of each of said channel end walls.

* * * * *

UNITED STATES PATENT OFFICE
CERTIFICATE OF CORRECTION

Patent No. 3,638,274  Dated Feb. 1, 1972

Inventor(s) Alfred Farver

It is certified that error appears in the above-identified patent and that said Letters Patent are hereby corrected as shown below:

Column 4, line 70, "Each" should be --End--;

Column 6, line 56, after "on" insert --the--;

Column 7, line 41, after "of" insert --a--.

Signed and sealed this 27th day of June 1972.

(SEAL)
Attest:

EDWARD M. FLETCHER, JR.       ROBERT GOTTSCHALK
Attesting Officer      Commissioner of Patents